US 6,685,366 B1

(12) United States Patent
Corbin

(10) Patent No.: US 6,685,366 B1
(45) Date of Patent: Feb. 3, 2004

(54) CAMERA POSITIONING SYSTEM WITH OPTIMIZED FIELD OF VIEW

(75) Inventor: Scott Alan Corbin, Stevens, PA (US)

(73) Assignee: Robert Bosch GmbH, Stuttgart (DE)

( * ) Notice: Subject to any disclaimer, the term of this patent is extended or adjusted under 35 U.S.C. 154(b) by 1018 days.

(21) Appl. No.: 08/924,865

(22) Filed: Sep. 5, 1997

(51) Int. Cl.[7] .............................................. G03B 17/02
(52) U.S. Cl. ...................................... 396/427; 348/143
(58) Field of Search ................................. 396/297, 419, 396/427, 429, 433; 348/143, 151, 211, 212, 213

(56) References Cited

U.S. PATENT DOCUMENTS

| | | | | |
|---|---|---|---|---|
| 4,974,088 A | * | 11/1990 | Sasaki | 348/213 |
| 5,526,041 A | * | 6/1996 | Glatt | 348/143 |
| 5,808,670 A | * | 9/1998 | Oyashiki et al. | 348/143 |

* cited by examiner

Primary Examiner—David Gray
(74) Attorney, Agent, or Firm—Kenyon & Kenyon

(57) ABSTRACT

A camera positioning for optimizing the field of view of a camera by adjusting the stop limits of the camera positioning system system in dependence upon the extent of the angle of view of the camera. If within a camera's field of view, there are areas devoid of useful information, the stop limit is dynamically changed each time the camera's angle of view is adjusted, so as to continually minimize the inclusion of such areas in the camera's field of view. Specifically, in a Pan/Tilt/Zoom camera positioning system, the Pan and/or Tilt stops are dynamically adjusted in dependence upon the Zoom.

7 Claims, 9 Drawing Sheets

CAMERA POSITIONING SYSTEM WITH OPTIMIZED FIELD OF VIEW

Background of the Invention

1. Field of the Invention

This invention relates to a camera positioning system, typified by a stationary mounted camera having an adjustable field of view. The camera's field of view may be changed via pan, tilt, or zoom operations. Of particular relevance to this invention are cameras which are mounted adjacent a stationary plane, such as a wall or ceiling, and which have zoom capability.

2. Description of Related Art

Commercial security systems often comprise security camera systems. The camera system typically comprises a camera having a magnification (zoom) capability, mounted upon a platform which can rotate in a horizontal plane (pan), and in a vertical plane (tilt). The operator is provided with means for effecting the pan, tilt, or zoom operations, typically via rocker switches associated with each operation. The pressing the switch at one end effects a movement in one direction, the pressing of the switch at the other end effects a movement in the opposite direction. Other adjusting means, such as joysticks, are also common, such systems also often provide an ability for automation, a continuous scan of an area, or a directed adjustment to a particular area in the event of an alarm.

Typically, the placement of the security camera system is chosen to be at a non-obtrusive location, such as mounted in a ceiling or wall fixture. The fixtures are designed to be non-obtrusive as well, extruding as little as possible from the ceiling or wall. Because of this placement, the effective field of view of the camera is bounded by the ceiling or wall, even though the span of movement of the camera (pan, tilt) or the camera's lens (zoom) may extend beyond the ceiling or wall. Conventional systems often contain pan and tilt "stops" to prevent the operator from adjusting the camera to beyond the ceiling or wall. Such stops are sets to limit the camera rotation in the horizontal or vertical direction, ideally in such a way so that the extreme of the camera's view angle is coincident with the ceiling or wall.

Because the camera's view angle is dependent upon the magnification, or level of zoom, of the camera, the coincidence of the extreme of a camera's view and the ceiling or wall will only occur at a particular level of zoom. Views at a lower level of zoom will result in a wider camera view angle, and thus include more of a view of the ceiling or wall. The included view of the ceiling or wall results, in effect, in a reduced view of the secured area, because the view of the ceiling or wall contains no useful security information. Views at a higher level of zoom will result in a narrower camera view angle, thus eliminating the view of the scene between the ceiling or wall and the extreme of the narrower camera view angle. The latter case presents a potential security flaw, by producing a void, or blind spot, in the secured area; for this reason, the stop is typically set when the camera is at the highest level of zoom. Thereafter, the view of the scene adjacent to the ceiling or wall will result in the aforementioned loss of useful viewing area at all other levels of zoom.

SUMMARY OF THE INVENTION

It is an object of this invention to optimize the viewing area of a camera system by minimizing the inclusion of bounding areas, such as ceilings and walls, in said viewing area, at all angles of view of the camera. This object is accomplished by suitably adjusting the line of sight of the camera in dependence upon the camera's angle of view, and in dependence upon the location of the bounding area relative to the camera's line of sight and angle of view.

Depending upon the degree of optimization required, the appropriate adjustment can be determined algorithmicly or empirically. Algorithmic means can be provided to appropriately adjust the camera's line of sight by employing a two or three dimensional model of the camera's field of view within its situated environment. Empirically, the adjustment can be determined by positioning the camera such that the view is optimized at varying angles of view, storing the parameters of the optimized views, and subsequently determining the adjustment required at other angles of view based upon an interpolation of the stored parameters.

DESCRIPTION OF THE PREFERRED EMBODIMENTS

Figure 1:
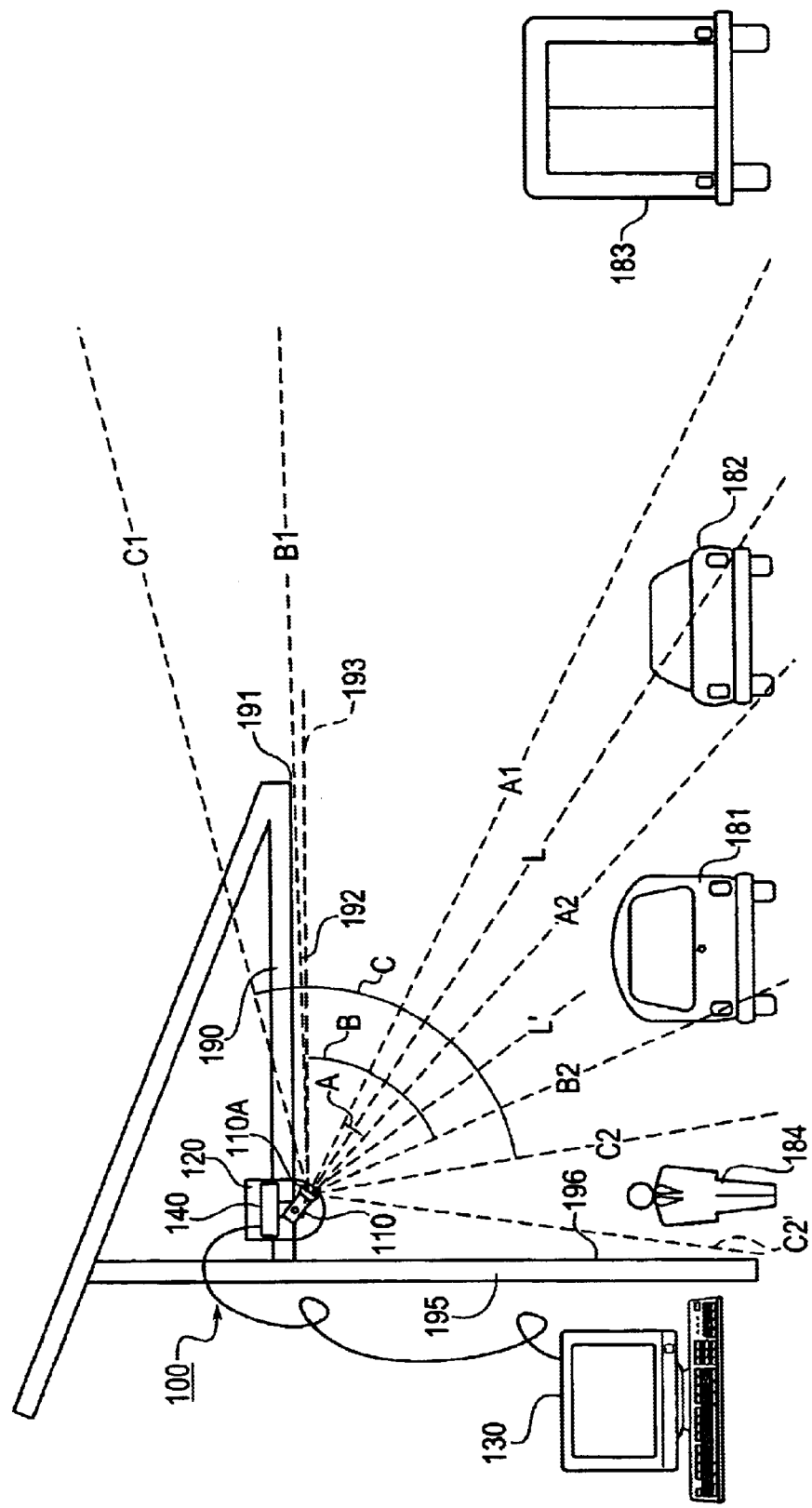
FIG. 1 shows a camera positioning system situated in a typical security environment.

FIG. 1 shows a camera positioning system situated in a typical security environment. A camera 110 including a lens 110A having an adjustable magnification, which is mounted in an enclosure 120 which is situated in an overhead structure 190, such as an carport adjacent a parking area. The positioning system 100 comprises a means 140 for rotating the camera about at least one, and typically two, axes of rotation, and a control station 130. An operator, not shown, can cause the rotation of the camera 110 via input to the control station 130; additionally, the control station 130 may be programmed to rotate the camera at fixed intervals, or in response to an alert, such as the receipt of an alarm signal. The direction the camera is facing determines its line of sight; conventionally, the line of sight is the straight line projection from the focal point of the camera's lens through the center of the lens. By rotating the camera, the camera's lens is rotated, and thus the line of sight is rotated.

The camera's angle of view can also be adjusted via the control station 130, typically by effecting a change in the camera's magnification, or level of zoom. Alternatively, the camera's angle of view may be adjusted by changing the shape of the lens, for example, by switching to a very wide angle lens, such as a "fish-eye" lens. For ease of understanding, adjusting a camera's angle of view will hereinafter be discussed in terms of changing the camera's magnification, although the principles of this invention are applicable to alternative means of adjusting a camera's angle of view, which are well known in the art. Conventionally, the angle of view of a camera is defined as the angular measure, typically symmetric about the line of sight, within which an object in a scene is viewable by the camera.

The combination of line of sight and angle of view determines a camera's field of view. A camera may have different angles of view in different directions, or it may be symetric. For example, a camera having a uniform angle of view in all directions will have a circular field of view, centered about the line of sight. More traditionally, the camera forms part of a video system, wherein the images are intended to be viewed in a rectangular format; in such systems, the camera's angle of view in the horizontal direction is different than its angle of view in the vertical direction, resulting in a rectangular field of view, centered about the line of sight.

FIG. 1 also shows vehicles 181, 182, and 183, and a person 184, within the area potentially viewable by the camera 110. Whether the objects are actually within view of the camera is determined by the camera's field of view, which is determined by its line of sight and its angle of view. FIG. 1 shows the camera 110 being positioned with a line of sight L. About the line of sight L are three angles of view A, B, and C, the extents of which are represented by dashed lines A1–A2, B1–B2, and C1–C2. If the camera has an angle of view of A, the camera's field of view will encompass the items between lines A1 and A2. Thus, at angle of view A, the vehicle 181 and the person 184 are not in view of the camera. At angle of view B, the camera's field of view encompasses the items between B1 and B2, and therefore each of the vehicles 181, 182, and 183 will be in view of the camera. Also within view of the camera at angle of view B is the edge 191 of the overhead structure 190. At angle of view C, the field of view extends from C1 to C2, and encompasses each of the vehicles 181, 182, 183, the edge 191 of the overhead structure 190, and a ceiling portion 192 of the overhead structure 190. The person 184 is not within the field of view of the camera at angles of view A, B, or C.

Figure 2:
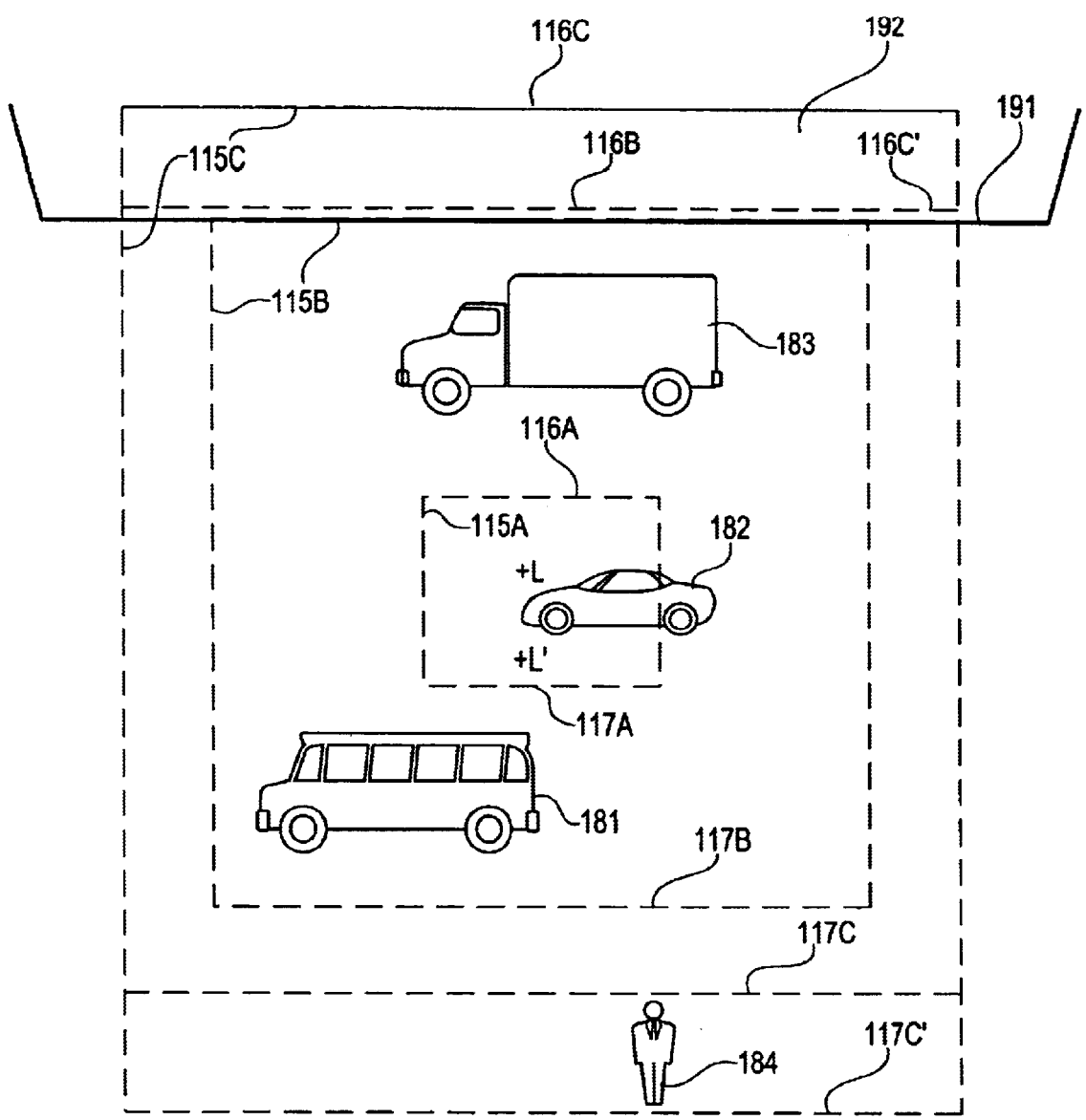
FIG. 2 shows the fields of view of a camera at different angles of view.

FIG. 2 shows the images corresponding to the fields of view in the example scene of FIG. 1. The dashed lines 115A, 115B, and 115C outline the perimeter of the fields of view corresponding to the angles of view A, B, and C, respectively. Segments 116A, 116B, and 116C represent the upper edge of the respective perimeters 115A, 115B, and 115C, and segments 117A, 117B, and 117C represent the lower edge. As shown, the vehicle 181 lies outside the perimeter 115A, and is not viewable at angle of view A. The edge 191 of the overhead structure 190 is just within the perimeter 115B, and is viewable at angle of view B. Of particular note is the ceiling portion 192 of the overhead structure 190, which is within the perimeter 115C, and consumes a significant portion of the view at angle of view C. This view of the ceiling portion 192 provides no useful security information. A conscientious operator of the security system would, upon noting the useless portion, typically adjust the tilt angle of the camera downward, so that more of the secured area would be viewed at this angle of view. Such an adjustment is represented by line segments 116C' and 117C', corresponding to a displacement of the line of sight from L to L'. By adjusting the line of sight so as to minimize the portion of useless area, more pertinent security information, such as the presence of a person 184, will be within the camera's field of view.

Conventionally, camera positioning systems contain one or more "fstops" on the extent of rotation of the camera, to prevent the camera's field of view from extending significantly into areas having no useful security information. These stops are typically adjusted and set when the camera is installed, and remain fixed. Although the stops may be mechanical, and located within the enclosure 120, a control stop, within the controller 130 can be effected, wherein the commands transmitted to the rotation means 140 are structured so as to preclude a rotation of the camera beyond the stop. For example, consider FIG. 1 having a stop such that the camera cannot be tilted beyond that shown; that is, wherein the line L represents the uppermost limit of the angular displacement of the camera's line of sight. If such a stop were employed, the field of view at angle of view B could be considered optimal with regard to the amount of useful security information at this angle of view, because only a minimal portion of the overhead structure 190 is present in the field of view. At angle of view C, the view is suboptimal because it contains a significant amount of the ceiling portion 192, which contains no useful security information. At angle of view A, the view is also optimal with regard to the amount of useful security information, because none of the overhead structure 190 is present within the field of view. However, if the line L represents the maximum extent of the line of sight in the vertical direction, the view is suboptimal with respect to the extent of security coverage provided. That is, if angle of view A is selected, the region between segments A1 and B1 will be unviewable, and this would be a flaw in the security provided by the security system. To prevent the preclusion of portions of the secured area from viewing, the conventional static stop will be set when the camera is set to its narrowest angle of view, thereby allowing for a complete view of the secured area at any subsequent, wider, angle of view.

Note that, in FIG. 1, line of sight L provides an optimal security information view for angle of view B, and line of sight L' provides an optimal security information view for angle of view C. In accordance with this invention, the camera positioning device 100 automatically determines the appropriate line of sight to provide the optimal security information view for each angle of view. As the angle of view changes, the stops which limit the rotation of the camera are set to effect the appropriate lines of sight. For example, in FIG. 1, the stops will be set to lines of sight L and L', respectively, when the camera is set to angles of view B and C.

Stops need not be set in dependence upon an edge of a physical area such as the overhead structure 190. An imaginary plane 193, parallel to the ceiling portion 192 of the overhead structure 190 can be defined as a bounding area. The stop would be set so as to minimize the portion of this imaginary plane 193 being present in the camera's field of view. Equivalently stated, the stop can be set so that the edge of the extent of the field of view is coincident with the edge of the bounding area, where the bounding area can be defined independent of physical areas and boundaries. Similarly, the bounding area may include only a portion of a physical area. For example, the structure of FIG. 1 contains a wall 195. It may be desirable to include in a security field of view the lower portion of the wall, but not the upper portion. The bounding area could be defined as the area of the wall 195 having a lower edge 196. Portions of the wall below this edge 196 will be included in the security view, and portions of the wall above this edge will be considered to contain no useful security information. Note that, as shown by edges 191 and 196, security systems may have multiple bounding area limits, and multiple stops to impose these limits. For ease of understanding, this invention will be described in terms of a singular stop, although the application to multiple stops will be evident to one skilled in the art.

Also note that thus far, the edges of the bounding areas have been presented as being substantially parallel to the axis of rotation of the camera, and substantially parallel to an edge of the perimeter of the field of view. In such a configuration, the edge of the field of view can be substantially aligned with the edge of the bounding area merely via a rotation about the parallelled axis of rotation. Techniques are well known in the art for rotating a camera through a virtual axis of revolution, which may or may not correspond to one of the physical axes of revolution of the camera, by computing and applying the equivalent amount of rotation required in each physical axis, so as to emulate the movement of a camera having a physical axis corresponding to the aforementioned virtual axis. For ease of understanding, this invention will be described in terms of positioning the camera to effect a given line of sight, typically via a rotation in a single axis, although the application to rotations in multiple axis will be evident to one skilled in the art.

Figure 3:
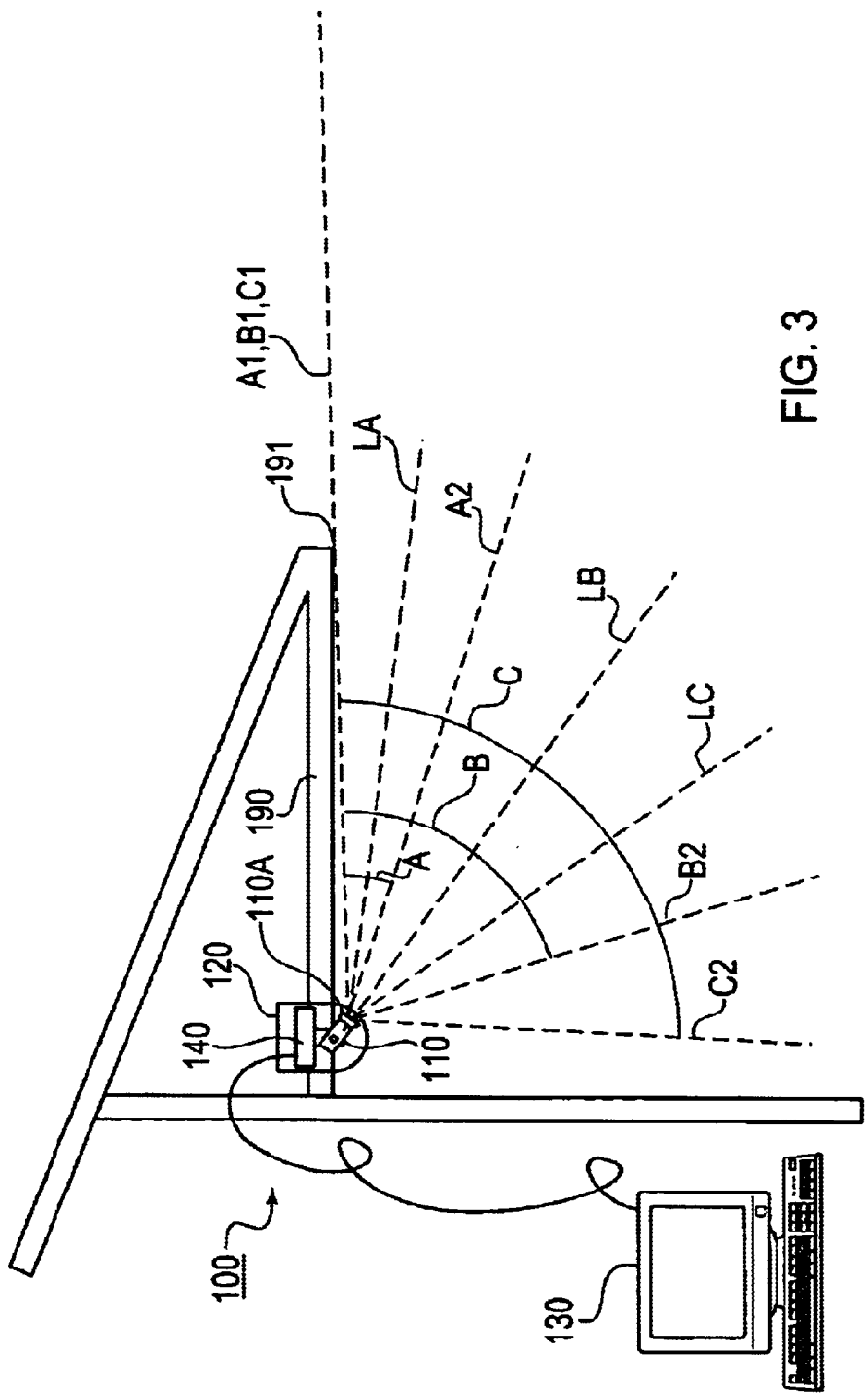
FIG. 3 shows a camera positioning system with a dynamic tilt stop, in accodance with this invention.

FIG. 3 shows a camera positioning system with dynamic stop adjustments in accordance with this invention. Angles of view A, B, and C are shown with their corresponding extents A1–A2, B1–B2, and C1–C2, as in FIG. 1. As shown, the extents A1, B1, and C1 of the angles of view A, B, and C are coincident, and intersect the edge 191 of the overhead structure 190. As discusssed above, aligning the extents of the angles of view with the edge of a bounding area optimizes the amount of useful security information present within the field of view, by minimizing the inclusion of the bounding area. The extents of the angles of view correspond to the edge of the corresponding field of view. The lines of sight LA, LB, and LC which produce the optimized security views corresponding to angles of view A, B, and C are the bisections of the angles A, B, and C when the edge of their fields of view coincide with the edge of the bounding area. In accordance with this invention, when the angle of view of the camera is A, B, or C the stop is determined so as to limit the camera position to the lines of sight LA, LB, and LC. If the camera is positioned beyond the determined stop, the camera is automatically positioned to this stop. Thereafter, the camera will be precluded from rotating beyond the determined stop, thereby optimizing the security view, at the angle of view corresponding to the stop.

Figure 4A:
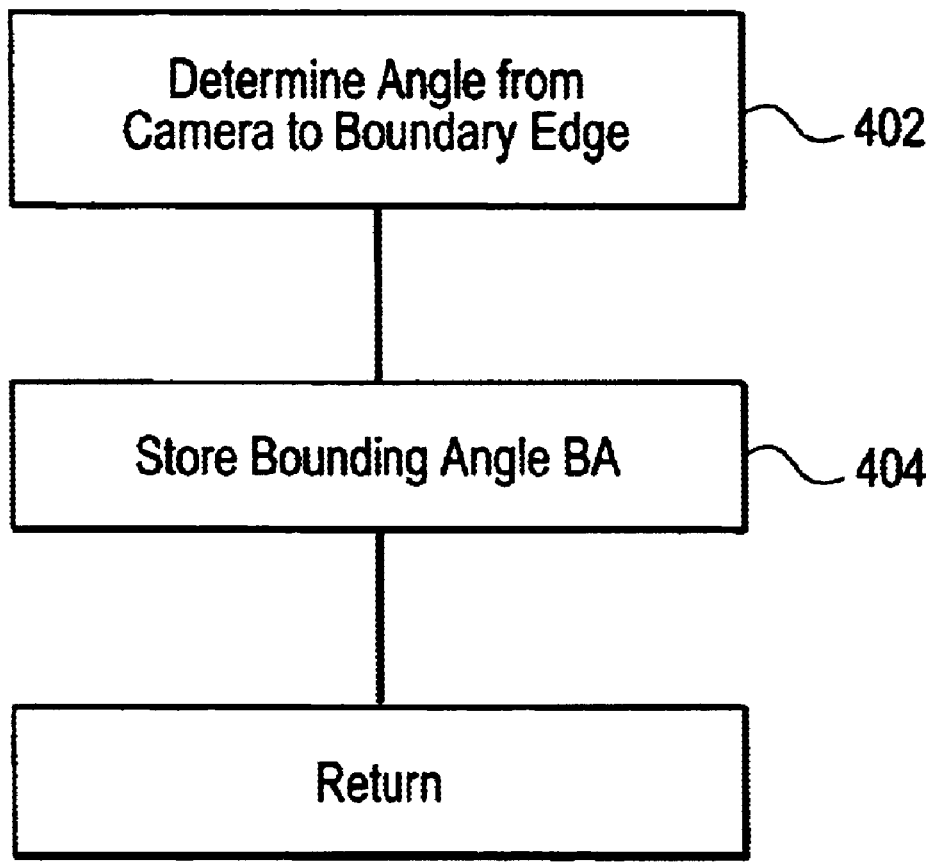
FIG. 4 shows a flowchart for dynamically adjusting a camera positioning stop limit based upon a geometric model.
Figure 4B:
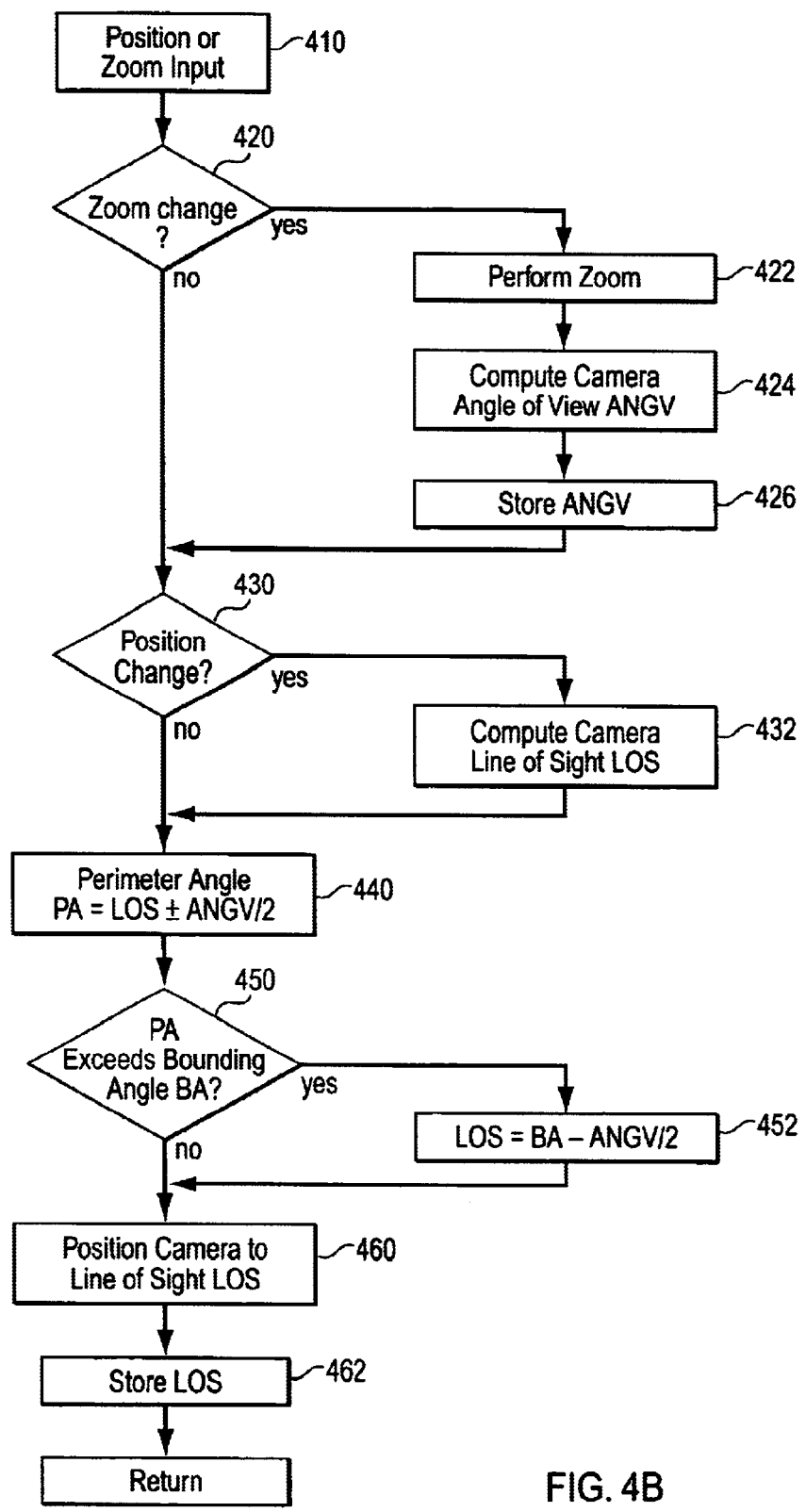
Figure 4C:
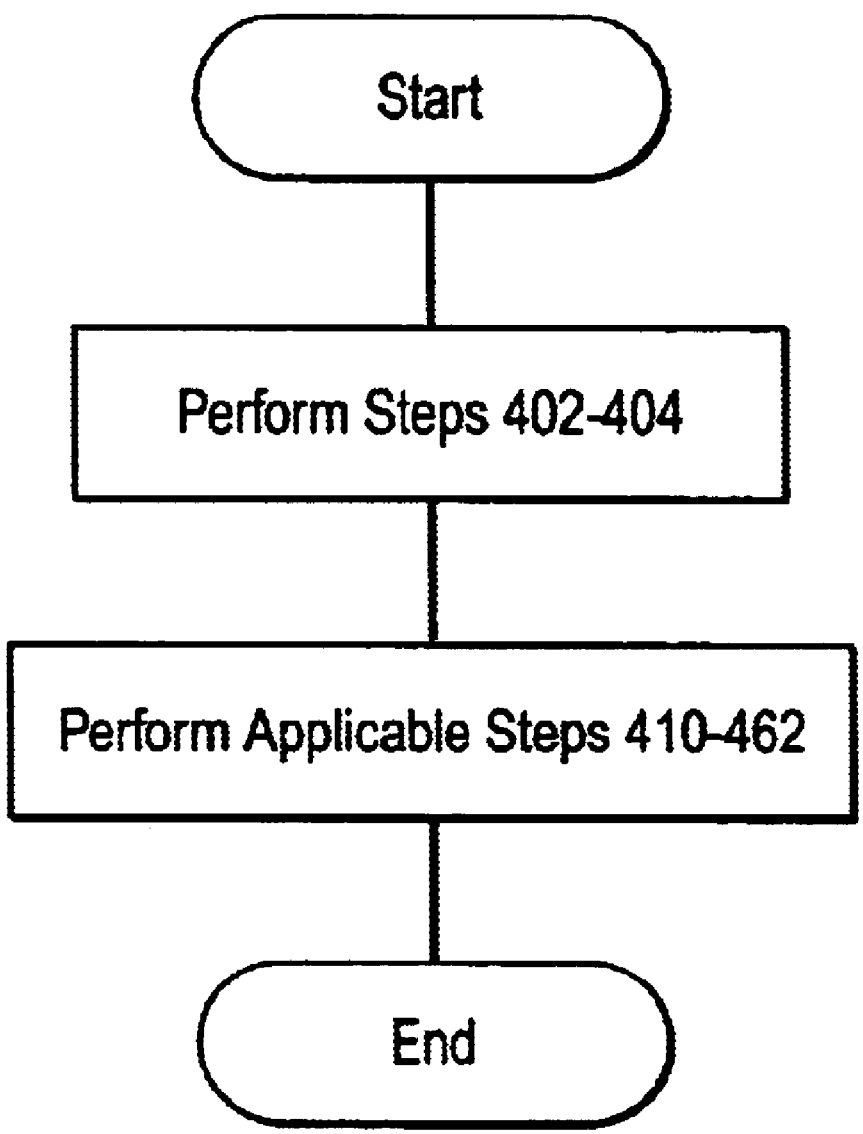

The determination of the stop corresponding to a particular angle of view can be accomplished algorithmically or empirically. As discussed thus far, the appropriate line of sight limit can be determined by bisecting the angle of view when the extent of the view is aligned with the edge of the bounding area. FIG. 4 shows a flow chart for effecting this algorithmic determination with FIG. 4c being a master flow chart indicating the order of the steps to be performed in FIGS. 4a and 4b. The flowchart in FIG. 4a represents the initialization of the camera positioning system to effect the dynamic stop determination. It is assumed herein that conventional engineering practices, such as initializing all variables, will be utilized, and need not be shown. The bounding angle, between the camera and the bounding edge, must be determined 402, and stored 404. The bounding angle can either be computed from a geometric representation of the installation within the computer, or measured from, for example, a blueprint of the installation. Optionally, the bounding angle can be a nominal angle, such as "horizontal", similar to the line shown as 193 in FIG. 1. This angle is the angle to which the maximum extent of an angle of view will be limited.

In operation, shown in FIG. 4b, the control positioning system will access the routine at 410 whenever the user enters a change to the camera's angle of view, or position. If the user has input a change to the angle of view via a zoom command 420, the change is effected 422, and the new angle of view is determined 424, and stored 426. To effect this algorithmic determination, the positioning system must have a means of associating, or correlating, the user input to a measure of the resultant angle of view. For example, if the user types in a magnification factor, the positioning system would contain either a formula for converting a magnification factor to the resultant angle of view, or a table of values associating the magnification factors to angles of view. Optionally, the user input could directly control the zoom of the camera, and the camera could provide feedback to the positioning system which either directly or indirectly be used by the positioning system to determine the angle of view; in this optional case, block 422 would be replaced by a block which acquires the feedback from the camera. These and other techniques for determining or estimating a camera's angle of view are known to one versed in the art.

Whether the angle of view has changed or not, the user input is assessed to determine if a position change is requested 430. If a position change is requested, the new line of sight at this position is determined 432.

The extent of the angle of view, hereinafter referred to as the perimeter angle, corresponding to the aforementioned edge of the perimeter of the field of view, 116A, 116B, 116C of FIG. 2, is computed at 440. The perimeter angle is computed as the line of sight angle plus or minus half the angle of view. The plus or minus is determined by the relation of the bounding edge relative to the security area, and the convention (clockwise or counterclockwise) used for determining the sign of an angle. For example, in FIG. 1, if a clockwise rotation is considered positive, the perimeter angle relative to the edge 191 is equal to the line of sight minus half the angle of view; the perimeter angle relative to edge 196 is equal to the line of sight plus half the angle of view. For consistency, the algebraic signs in FIG. 4 are relative to a clockwise rotation being positive, and the bounding angle being the upper limit to the perimeter angle.

The perimeter angle is compared to the aforementioned stored bounding angle, at 450. If the perimeter angle is beyond the bounding angle, then the field of view of the camera will include a portion of the bounding area, and will be suboptimal. To optimize the view, at 452, an optimized line of sight is computed as the bounding angle minus or plus half the angle of view, the sign being dependent upon the convention used, as discussed above.

The camera is positioned to effect the line of sight, either the user input line of sight or the substituded optimal line of sight, at 460. The line of sight, is stored 462 so that it can be utilized subsequently in the perimeter angle calculations, at 440. Note that the automatic positioning to the optimal line of sight only occurs when the perimeter angle exceeds the bounding angle. Alternatively, to automate positioning the camera to continually track along the bounding edge, the automatic positioning can be effected whenever the prior perimeter edge is coincident with the prior bounding edge, as will be discussed with regard to FIG. 5.

As presented above, the camera positioning system optimizes the camera's field of view in dependence upon the computed extent of the angle of view, the perimeter angle, relative to the computed line of sight, and relative to the computed or determined angle between the camera and the bounding edge. To obviate the need for extensive computations, an empirical technique can alternatively be employed to optimize the camera's field of view. In the empirical embodiment, the user initially calibrates the system by manually positioning the camera to produce a set of optimized views at various angles of view, and saving the parameters associated with each of the optimized views associated with the angle of view. Thereafter, when the user utilizes one of the saved angles of view, the parameters associated with the optimized view associated with that angle of view can be recalled and utilized. Additionally, if the user utilizes an angle of view for which the user did not store such optimization parameters, the system will estimate the appropriate optimization parameters for that angle of view by, for example, interpolation of the saved optimization parameters.

Figure 5A:
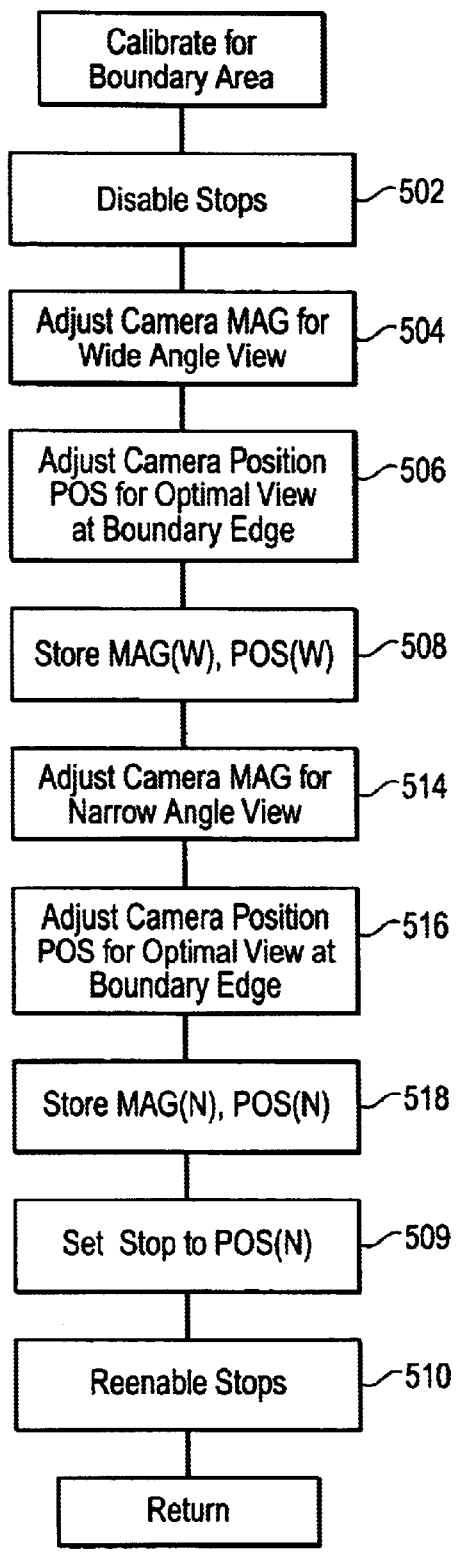
FIG. 5 shows a flowchart for dynamically adjusting a camera positioning stop limit based upon a set of calibration data.
Figure 5B:
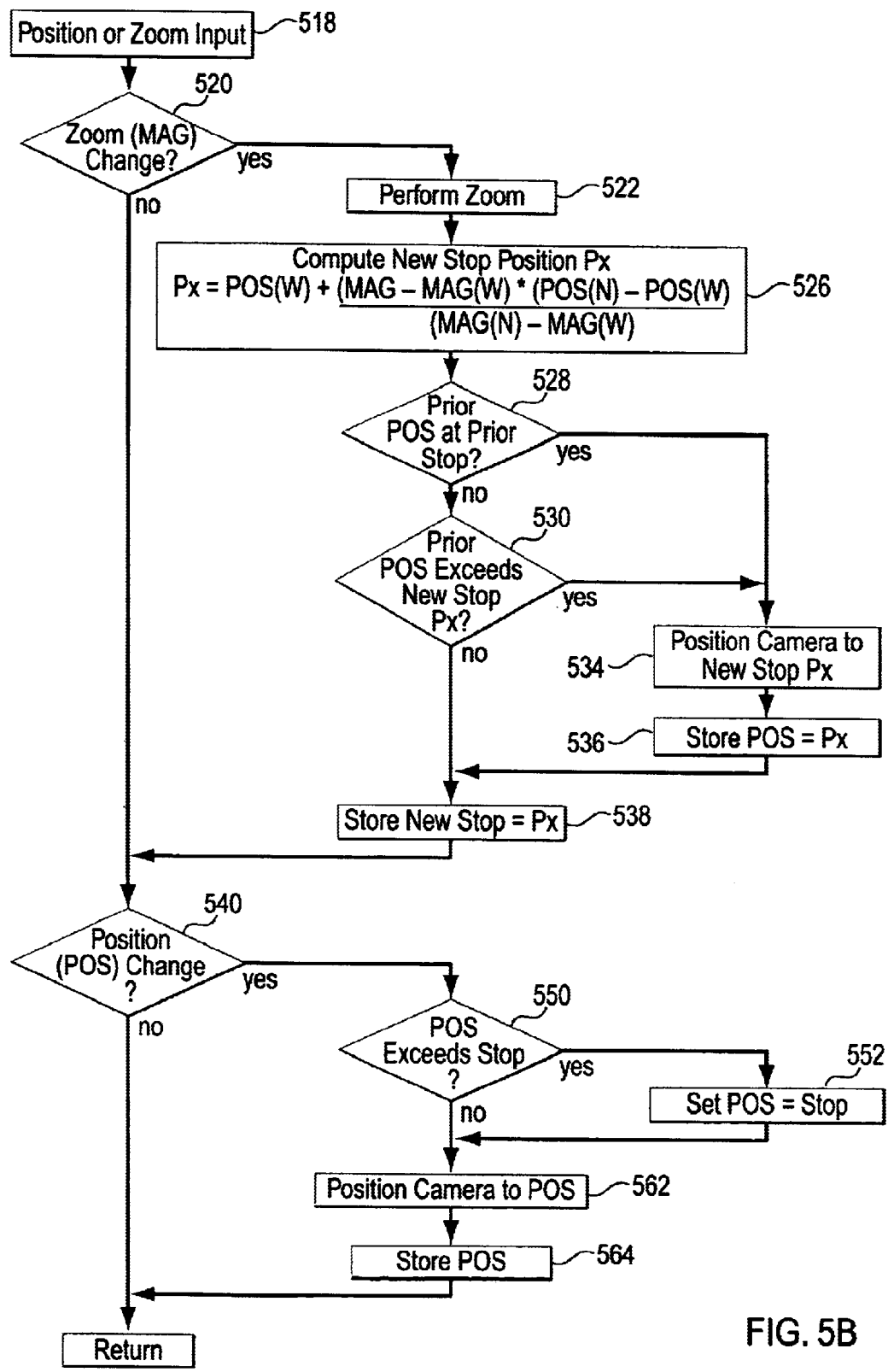
Figure 5C:
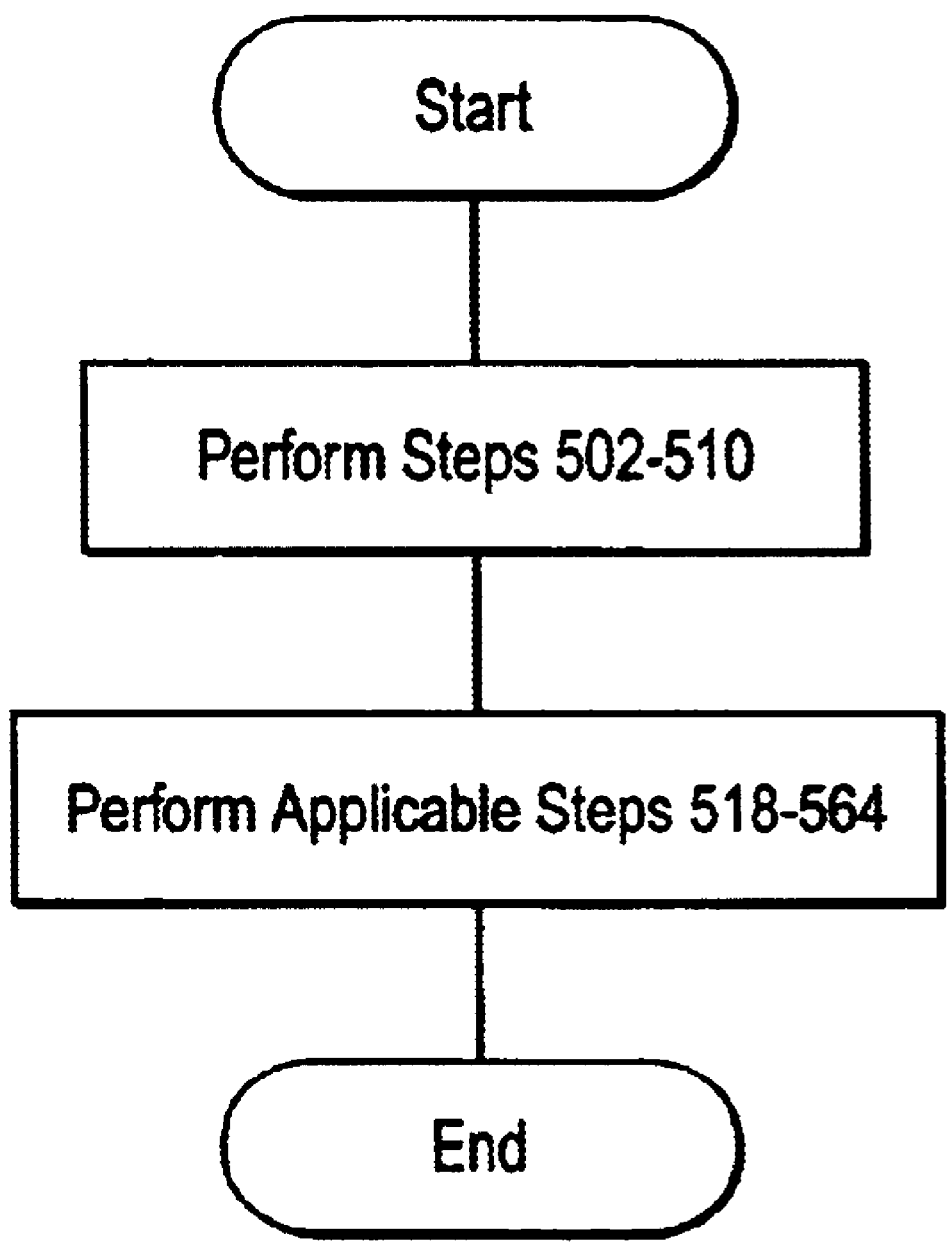

FIG. 5 shows a flowchart for an empirical determination of optimizing a camera's field of view with FIG. 5*c* being a master flow chart indicating the order of the steps to be performed in FIGS. 4*a* and 4*b*. In FIG. 5*a*, the user calibrates the positioning system for optimized views. In general, any number of calibration points can be entered, but the minimum number of calibration points is two. If the relationship between the user input and the angle of view is linear, then determining an angle of view for any user input can be interpolated from any two sets of a user input and a corresponding angle of view. If the relationship is non-linear, additional calibration points should be entered, and linear or non-linear interpolation techniques should be employed to determine intermediate values. Such interpolation techniques are well known in the art, and for ease of understanding, the flowchart of FIG. 5 shows the flow for a linear relationship between user input and the resultant angle of view.

The two calibration points required for subsequent interpolation preferably are calibration points at the narrowest angle of view, and at the widest angle of view. In FIG. 5*a*, at 502, any existing stops are disabled, so as to allow the user unconstrained positioning of the camera. The user then adjusts the camera for the maximum, wide angle, view, at 504. The user input parameter associated with this maximum view is termed MAG, because typically the user will enter a magnification factor. Alternatively, the user input may be the rotation of a knob, or a movement of a joystick. It can be any parameter, provided however, that subsequent adjustments of the angle of view can be associated and compared with this parameter; in this example embodiment, this user input parameter must be linear with the resultant angle of view.

At the wide angle view, the user positions the camera 506 for an optimal view at the edge of the bounding area; that is, at a position wherein the field of view is adjacent the bounding area, and contains a minimal, if any, portion of that bounding area. By definition, this position is the optimal position for the camera at this angle of view. At 508, this optimal position is saved as POS(W), and the user parameter which produced the wide angle of view is saved as MAG (W). Note that the position parameter need not be the line of sight of the camera, and the user parameter need not be the angle of view; direct computation of the line or sight or angle of view are not required. The position parameter would typically be the camera's pan and tilt rotation angles, or the rotation angle about a virtual axis of rotation parallel to the boundary area plane, as discussed above. For ease of understanding, the flowchart of FIG. 5*a* presents the position parameter as a single algebraic term, as would be used relative to a virtual axis of rotation.

The user next calibrates the system for an optimal view at the narrowest angle of view, in 514, 516, corresponding to 504, 506, discussed above. The optimal camera position for the narrow angle of view is saved as POS(N), and the user parameter which produced the narrow view is saved as MAG(N), at 518. Because the camera is at its narrow view, the stop is set to POS(N), at 509, and reenabled, at 510.

After calibration, the system responds to user positioning or zoom input as shown in FIG. 5*b*. Similar to FIG. 4, the user input is assessed to determine if a change of zoom is requested 520, and the zoom is performed 522. A new stop is computed at 526, based upon the user input parameter MAG. As shown, this computation is a conventional estimation by linear interpolation, utilizing the stored optimal positions POS(W), POS(N), and the stored user input parameters MAG(W), MAG(N). As discussed above, if the relationship between the user input and the angle of view is non-linear, alternative techniques can be employed to estimate the optimal positioning of the camera in relation to the user input, as are well known to one skilled in the art. For example, in a preferred embodiment, multiple calibration points are stored. For a user input MAG, the system determines between which two stored calibration points MAG lies, and then interpolates between these two adjacent points.

FIG. 5*b* shows an optional implementation wherein if the user has positioned the camera to a bounding edge, subsequent images at different zoom values will also be positioned at the bounding edge until the user purposely positions the camera away from the edge. Since a bounding edge is often a perimeter of the secured area, this option allows for rapid scanning of the perimeter at varying levels of zoom. This option may be disabled, such that when the user zooms in, the zoom occurs about the center of the view, rather than towards the bounding edge. To effect this perimeter zoom option, the prior position is compared to the prior stop, at 528. If the prior position is at the prior stop, the camera is positioned to the new stop, at 534. Also, if the prior position exceeds the new stop, at 530, the camera is positioned to the new stop, at 534. The new position and new stop are stored, at 536 and 538.

If the user requests a position change, at 540, the new position is compared to the stop, at 550. If the new position exceeds the stop, the new position is replaced by the stop, at 552. The camera is then positioned to the new position, either the user requested position or the stop position, at 562, and this position is saved, at 564.

Note that in FIG. 5, the only computation required is the interpolation of the optimal position values corresponding to a user input change to the camera's angle of view. Thus it is shown that, in accordance with this invention, the camera positioning system optimizes the camera's field of view by limiting the positioning of the camera in dependence upon the angle of view and two or more stored optimized positions, with minimal computational complexity.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A camera positioning system for positioning a camera with an adjustable field of view, which camera positioning system minimizes the inclusion of a bounding area within said field of view, said bounding area having a bounding edge, said camera having a line of sight and an angle of view, said line of sight and angle of view defining said camera's field of view, said field of view having a definable perimeter having at least one perimeter edge, said camera positioning system comprising:
- means for adjusting said camera's angle of view,
- means for adjusting said camera's line of sight, said camera's line of sight being limited at a predetermined stop, and
- means for determining said predetermined stop, said predetermined stop being determined in dependence upon said angle of view,
- such that at said predetermined stop, said perimeter edge of said field of view coincides with said bounding edge within said field of view.

2. A camera positioning system as in claim 1, wherein said means of adjusting said camera's line of sight further determines an angular distance, relative to said camera's line of sight, between said perimeter edge and said bounding edge, and said means for adjusting said camera's line of sight moves said camera's line of sight through said angular distance.

3. A camera positioning system as in claim 2, further comprising means for rotating said camera in a first plane, and also in a second plane which is orthogonal to said first plane.

4. A camera positioning system as in claim 1, wherein
- said camera comprises a lens having an adjustable magnification, and
- said means for adjusting said camera's angle of view comprises means for adjusting said lens magnification.

5. A camera positioning system as in claim 3, wherein the rotation of said camera to the stop occurs in at least one of said first or second planes.

6. A camera positioning system for a camera with an adjustable field of view, which camera positioning system minimizes the inclusion of a bounding area within said field of view,
- said bounding area having a bounding edge,
- said camera having a line of sight and an angle of view, said line of sight and angle of view defining said camera's field of view,
- said field of view having a definable perimeter having at least one perimeter edge,
- said camera positioning system comprising:
  - means for adjusting said camera's angle of view,
  - said camera's line of sight defining at least a first and second set of parameters for a first and second angle of view occurring when said perimeter edge and bounding edge coincide,
  - means for adjusting said camera's line of sight, said camera's line of sight being limited at a predetermined stop, and
  - means for determining said predetermined stop, said predetermined stop being determined by an interpolation of said first and second set of parameters based upon a third angle of view, whereby said camera is stopped from moving to a position where the field of view produced by said third angle of view includes areas beyond said bounding edge.

7. A method for optimizing the field of view of a camera having an adjustable position and an adjustable angle of view, comprising the steps of:
- determining a first position of the camera which produces an optimum view when at a first angle of view, said first angle of view having a corresponding first angle of view parameter for effecting said first angle of view,
- determining at least a second position of the camera which produces an optimum view when at a second angle of view, said second angle of view having a corresponding second angle of view parameter for effecting said second angle of view,
- said optimum views corresponding to when a minimal amount of a bounding edge of a bounding area is included within the field of view of said camera;
- setting a predetermined stop limit equal to an interpolation of said first and second positions based upon a third angle of view parameter, and
- limiting the position of said camera to said predetermined stop limit.

* * * * *

UNITED STATES PATENT AND TRADEMARK OFFICE
CERTIFICATE OF CORRECTION

PATENT NO. : 6,685,366 B1
DATED : February 3, 2004
INVENTOR(S) : Scott Alan Corbin It is certified that error appears in the above-identified patent and that said Letters Patent is hereby corrected as shown below:

Title page,
Item [57], ABSTRACT,
Line 1, change "A camera positioning for optimizing" to -- A camera positioning system for optimizing --.

Signed and Sealed this

Thirteenth Day of September, 2005

JON W. DUDAS
*Director of the United States Patent and Trademark Office*